United States Patent

[11] 3,602,531

[72] Inventor Leon R. Patry
Medina, Ohio
[21] Appl. No. 867,570
[22] Filed Oct. 20, 1969
[45] Patented Aug. 31, 1971
[73] Assignee Adjusta-Post Manufacturing Company
Akron, Ohio

[54] TUBING COUPLER

6 Claims, 4 Drawing Figs.

[52] U.S. Cl. .................................................. 285/177, 285/382, 285/397
[51] Int. Cl. .................................................. F16l 25/00
[50] Field of Search .................................................. 285/177, 332, 397, 382; 29/525; 287/535, 126

[56] References Cited

UNITED STATES PATENTS

| | | | |
|---|---|---|---|
| 1,607,725 | 11/1926 | Davis | 285/397 |
| 2,270,604 | 1/1942 | Roemhild | 285/119 |
| 3,342,511 | 9/1967 | Galloway | 285/177 |
| 3,353,848 | 11/1967 | Bleasby | 285/177 X |

FOREIGN PATENTS

| | | | |
|---|---|---|---|
| 1,067,092 | 5/1967 | Great Britain | 287/126 |

*Primary Examiner*—Dave W. Arola
*Attorney*—Oldham & Oldham

ABSTRACT: A unitary cast tubing coupler formed of a pair of tubular end sections, one of greater diameter than the other, and a conically shaped connector section extending between and connecting the end sections. Each of the end sections has a plurality of widely circumferentially spaced, axially extending narrow ribs on the outer surface thereof tapering radially inwardly at an angle of about 1° to 3° towards the axially outer ends of the end sections whereby a tube can be forced into engagement with each end section to form a coupler therebetween. The internal diameters of the end sections increase as they approach the exposed end of the section.

PATENTED AUG 31 1971 3,602,531

INVENTOR.
LEON R. PATRY

BY
*Oldham & Oldham*
ATTORNEYS

TUBING COUPLER

The present invention, generally speaking, relates to a tubing coupler particularly adapted to couple the ends of two tubes of different diameters without the use of threaded sections or movable coupling members being required.

BACKGROUND OF THE INVENTION

Heretofore there have been many different types of pipe and tubing connectors provided. Many so-called pipe connectors include the use of threaded sleeves, adapter members, etc. However, in tubing couplers, normally the trade considers such couplers to be of the types wherein no threaded sections, connecting sleeves, wedge members, etc. are provided. Tubing normally is considered to have thinner walls than pipes and is not readily adapted to have sleeves connected thereto, threads formed thereon, etc.

Previous efforts to supply satisfactory tubing couplers are represented by the disclosures provided in U.S. Pats. Nos. 2,270,604 and 3,342,511. However, in such previous types of tubing couplers, it has not always been possible to provide a fixed, solid type of a coupler, or the coupler has been relatively expensive, the coupler may have had movable parts therein, or the coupler may not have been completely satisfactory for some uses.

The general object of the present invention is to provide a novel and improved tubing coupler of relatively inexpensive, but sturdy design, and which coupler can readily be used for securing two tubes, usually, of different diameters, securely together.

Another object of the invention is to provide a cast unitary tubing coupler structure of attractive design and which has special engaging sections or means provided thereon for forming a forced fit connection between two adjacent and aligned tubes.

A further object of the invention is to provide a novel combination between two sections of tubing and a tubing coupler to provide a novel and improved combination for connecting tubing sections or lengths in order to provide lampposts, flagpoles, and the like.

The foregoing and other objects and advantages of the invention will be made more apparent as the specification proceeds.

When referring to corresponding members shown in the drawings and referred to in the specification, corresponding numerals are used to facilitate comparison between such corresponding members.

Figures 1, 2, 3, 4:
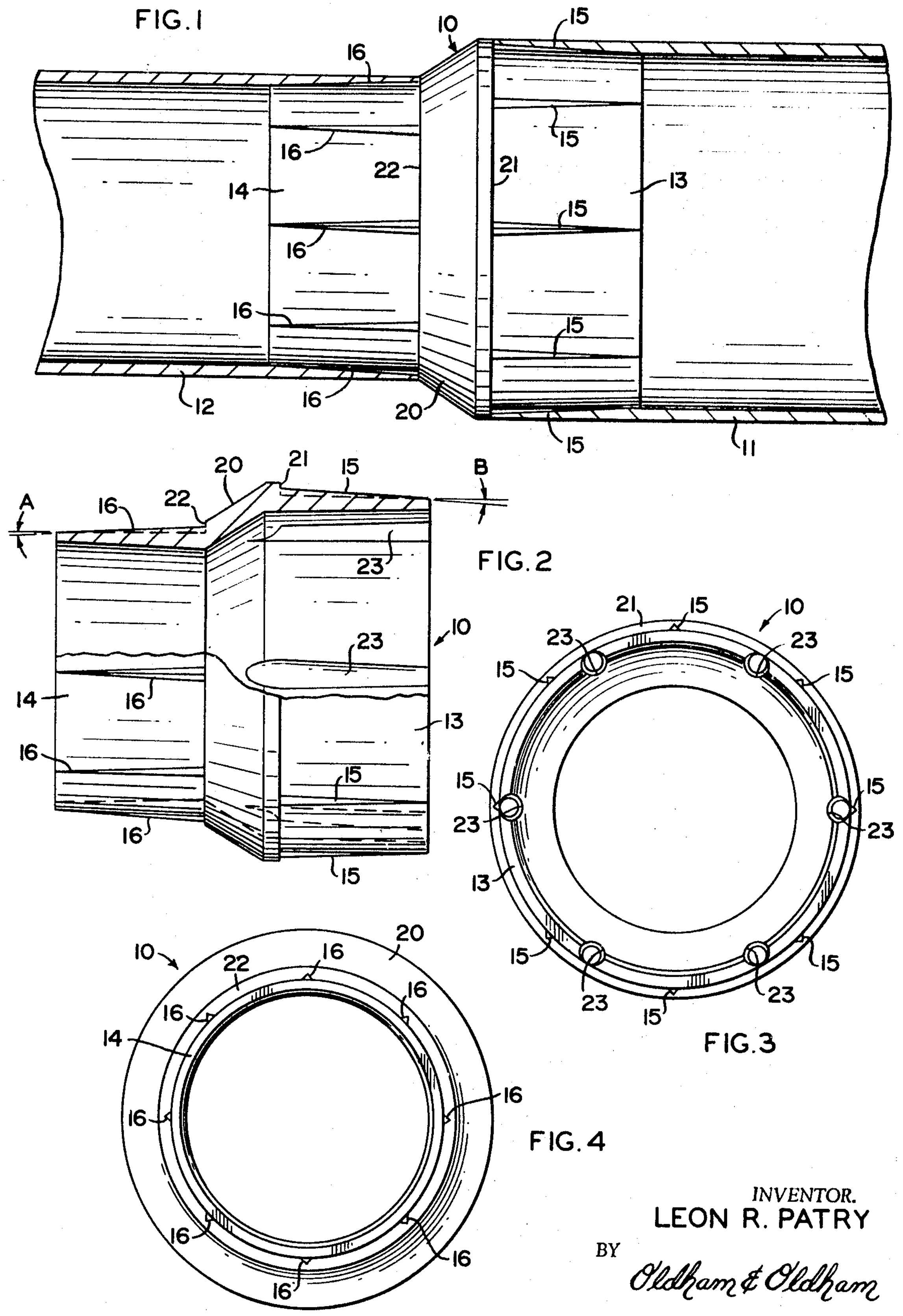
FIG. 1 is an elevation of a tubing coupler of the invention showing, in vertical cross section, two tube ends engaged therewith.
FIG. 2 is an elevation, partially broken away and shown in vertical cross section, of the tubing coupler embodying the principles of the invention shown in FIG. 1.
FIG. 3 is a right side or end elevation of the tubing coupler of FIG. 2.
FIG. 4 is a left end elevation of the coupler of FIG. 2.

INVENTIVE SUBJECT MATTER the tubing coupler of the invention comprises a member including a pair of tubular end sections, with one end section usually of greater diameter than the other, and a conically shaped connector section extending between and connecting such end sections and formed as a unit therewith. Each of these end sections includes a plurality of widely circumferentially spaced, axially extending narrow, short ribs on the outer surface thereof, which ribs have radially outwardly sharp edge portions, and all of such ribs tapering radially inwardly towards the axially outer ends thereof whereby tubing ends can be forced into engagement with the end sections on the tubing coupler and provide a force or friction fit therewith to provide a tubing assembly for use as a lamppole, or the like.

Attention is directed to the details of the structure shown in the drawings, and a tubing coupler 10 is shown in combination in engagement with tubes 11 and 12. The tube 11 is of larger diameter than the tube 12 and the tubing coupler 10 is adapted to engage by frictional fits with the ends of the tubes 11 and 12 to form a combination therefrom whereby the resultant article can be used to provide a section of a flag pole or other elongated structure having a plurality of the tubing couplers therein engaging associated tubes, or wherein the resultant structure can be used as a lamp post or for any other desired support activity. Use of the tubing coupler 10, which can be operatively engaged with the tubes 11 and 12 at the point of assembly, greatly facilitates shipping the overall tubing combination since the tubes 11 and 12 can, for example, have lengths, such as 4 to 8 feet, as desired, and be shipped in a compact, inoperative, unassembled form, but be readily engaged with each other operatively by the average person at the point of use.

The tubing coupler 10 has a pair of tubular end sections 13 and 14, respectively, with the end section 13 being the larger and being adapted to engage with the larger tube 11 while the smaller end section 14 is adapted to engage with the smaller tube 12 as indicated. However, the coupler can be used, if desired, with tubes of the same diameter.

As a feature of the invention, each of the end sections 13 and 14 is provided, respectively, with a plurality of axially extending ribs 15 and 16, on the outer periphery thereof. These ribs 15 and 16 preferably have a generally triangularly shaped sectional contour and have sharp outer ends as indicated in FIGS. 3 and 4 of the drawings. The ribs are relatively widely spaced, and any desired number of the ribs are provided, usually in diametrically opposed pairs, and with usually from about 6 to 10 ribs being provided. However, if desired, a smaller number of ribs may be used with a minimum of three equally circumferentially spaced ribs being the minimum ribs that normally would be used in practice of the present invention. As yet a further feature of the ribs 15 and 16, both of such sets of ribs are provided with radially outer edge surfaces that taper axially inwardly at a very small acute angle. FIG. 2 of the drawings indicates an angle A for the ribs 16, while an angle B is indicated for the ribs 15, and these angles may be, for example, between a minimum of about 1° or 2° inclination to the longitudinal axis of the tubing coupler, up to a maximum of about 3° inclination under normal operating conditions and where the tubing coupler is adapted to be used with tubes 11 and 12 made from, for example, steel. Preferably both end sections 13 and 14 also taper axially inwardly on their outer peripheries towards their exposed ends at an angle of, for example, about 2°. Likewise, the inner surface of these end sections 13 and 14 may taper axially outwardly at an acute angle, again of approximately 2°. By the particular contours of the tubing coupler 10 and the end sections thereof as indicated, the casting of this unitary tubing coupler 10, for example, from aluminum or other suitable materials, is facilitated.

It should be noted that the ribs 15 and 16 blend into the contour of the periphery of the end sections 13 and 14 at, or adjacent, the exposed ends thereof.

Naturally the tubing coupler may be made of any desired wall thickness so as to provide the required strength to engage and position the tubes 11 and 12. A conically shaped connector section 20 is provided to connect the end sections 13 and 14 provided in the tubing coupler. Such conically shaped connector section preferably has an end should or flange 21 provided thereon and an end should 22 may be provided at the opposite end thereof so that the ends of the tubes 11 and 22 can be forcibly slid axially of the tubing coupler to abut on these flanges or shoulders 21 and 22 under normal operating circumstances. Hence, a good friction fit is obtained between the tubes 11 and 12 and the tubing coupler. This conical section 20 would be formed of tubular contour if the coupler is to be used with tubes of the same diameter.

The casting or molding of the unitary tubing coupler 10 may be facilitated by the provision of axially extending ribs or embossments 23 on the bore of the larger coupling section 13, as indicated in FIGS. 2 and 3 of the drawings, and this facilitates ejecting the tubing coupler from the casting mold.

It is submitted that a novel, improved unitary tubing coupler has been provided by the invention. This coupler can readily be assembled with associated tubes at the point of use of a lamp post or other pole member and a permanent coupling can be provided between the associated tubes. The tubing coupler is adapted to provide a substantially watertight seal, and an attractive, smooth tubing coupler is provided that effectively secures the associated tubes in fixed relation ship to each other and forms a sturdy pole section or structure. Thus, the objects of the invention are believed to be achieved.

What is claimed is:

1. A tubing coupler comprising a pair of tubular end sections and an annular connector section extending between and connecting said end sections, each of said end sections including a plurality of widely circumferentially spaced, axially extending ribs on the outer surface thereof, all of said ribs tapering over their entire length radially inwardly towards the axially outer ends thereof and having an inclination of from about 1° to about 3° to the axis of the end sections, said ribs blending into the periphery of the end section on which they are positioned adjacent the terminal outer end thereof, said coupler being a unitary casting, the bores of said end sections enlarging towards the outer ends thereof, both the outer and inner walls of said end sections taper towards each other at small acute angles in a direction towards the end of the tubing coupler, and between about 6 to 10 ribs are provided on each of said sections.

2. A tubing coupler as in claim 1 and where axially extending ribs are formed on the inner wall of one of said end section to facilitate ejection of the tubing coupler from its casting mold.

3. A tubing coupler as in claim 1 where one of said tubular end sections is of greater diameter than the other, and a conical shaped connector section extends between and connects said end section.

4. In combination, a pair of tubes of different diameters and a tubing coupler comprising a pair of tubular end sections, one of greater diameter than the other, and a conical shaped connector section extending between and connecting said end sections, each of said end sections including a plurality of widely circumferentially spaced axially extending ribs on the outer surface thereof, all of said ribs tapering over their entire length radially inwardly towards the axially outer ends thereof, said tubes having inner diameters corresponding to the outer diameters of said end section in the nonribbed areas thereof, said coupler having a radially outwardly extending should at each end of said connector section, and said tubes having respective ends thereof tightly engaging said end sections and abutting against said shoulders.

5. A tubing coupler as in claim 4 where said coupler is a unitary casting, said ribs have an inclination of from about 1° to about 3° to the axis of the coupler, and said ribs blends into the periphery of a said end section adjacent the axially outer end thereof.

6. A tubing coupler as in claim 4 where said coupler is a unitary casting, said ribs have an inclination of from about 1° to about 3° to the axis of the coupler, said ribs blend into the periphery of a said end section adjacent the axially outer end thereof, and where the internal diameters of said end section gradually increase towards the exposed ends thereof.

UNITED STATES PATENT OFFICE

CERTIFICATE OF CORRECTION

Patent No. 3,602,531 Dated August 31, 1971

Inventor(s) Leon R. Patry

It is certified that error appears in the above-identified patent and that said Letters Patent are hereby corrected as shown below:

Col. 1, line 63, "the" should read -- The --.
Col. 2, line 67, "should" should read -- shoulder --.
Col. 2, line 68, "should" should read -- shoulder --.
Col. 2, line 69, "22" should be -- 12 --.
Col. 3, line 13, "relation ship" should read -- relationship --.
Col. 3, line 35, Claim 2, "section" should read -- sections --.
Col. 4, line 19, Claim 4, "should" should read -- shoulder --.
Col. 4, line 26, Claim 5, "blends" should read -- blend --.
Col. 4, line 33, Claim 6, "section" should read -- sections --.

Signed and sealed this 28th day of March 1972.

(SEAL)
Attest:

EDWARD M.FLETCHER,JR.
Attesting Officer

ROBERT GOTTSCHALK
Commissioner of Patents